Aug. 9, 1938. W. A. HART 2,126,110
BROACHING MACHINE
Filed April 29, 1935
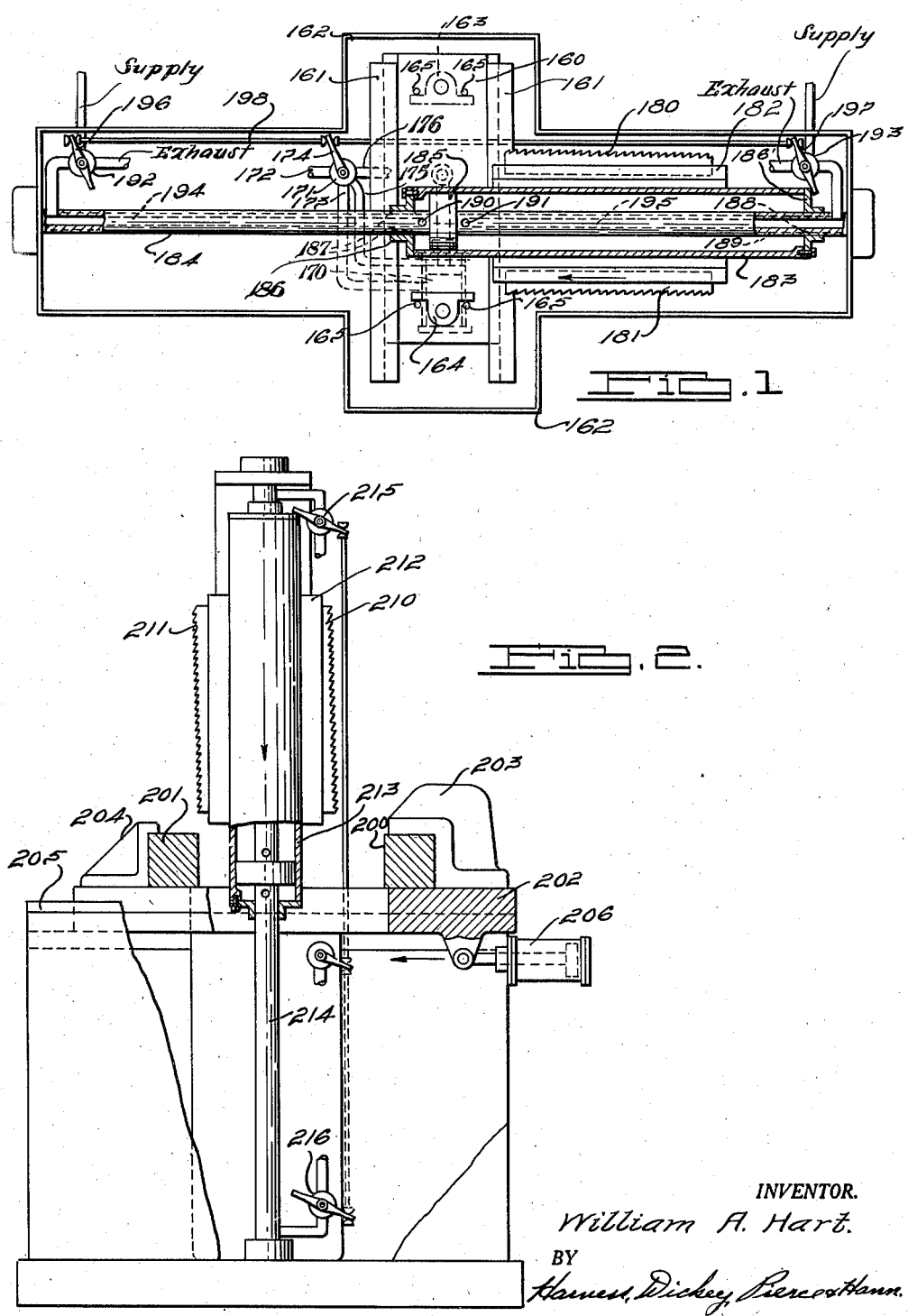
INVENTOR.
William A. Hart.
BY
ATTORNEYS.

Patented Aug. 9, 1938

2,126,110

UNITED STATES PATENT OFFICE 2,126,110

BROACHING MACHINE

William A. Hart, Detroit, Mich., assignor to Colonial Broach Company, a corporation of Michigan Application April 29, 1935, Serial No. 18,842

3 Claims. (Cl. 90—33)

The present invention relates to machines for operating metal working tools, and particularly to machines for operating surface broaching tools in multiple.

In accordance with one known arrangement, the broaching machine comprises a movable tool carriage, and a plurality of movable work tables. The tool carriage supports a number of broaching tools, corresponding in number to the number of work tables, and is arranged for rectilinear reciprocating motion. In order to conserve the motion of the tool carriage, certain of the broaching tools are disposed to cut during one direction of motion thereof and others are disposed to cut during the opposite direction of motion.

The work tables are movable toward and away from the path of the tool carriage, so that during the return movement of a particular broaching tool, the table associated therewith may be withdrawn, to permit a new work piece to be secured in place. All of the work tables are disposed on the same side of the broaching machine, so that a single operator is enabled to conveniently control a plurality of such tables.

In accordance with the present invention, a single work table may be arranged to support a plurality of work pieces. In the illustrated forms of the invention, the single work table is movable at right angles to the path of motion of the tool carriage, and the work pieces are located on opposite sides of the tool carriage. With this arrangement, each movement of the work table moves one work piece to cutting position, and moves another work piece to loading position.

In accordance with each of the embodiments of the present invention illustrated and described herein, the motion of the tool supporting carriage, as well as of the work tables, is automatically controlled. With this arrangement, after the machine has been initially placed in operation, the tool supporting carriage reciprocates continuously, the motion thereof being automatically reversed at the ends of the path of travel. At each reversing operation, a work piece previously in loading position is automatically moved to cutting position, and a piece previously in cutting position is moved to loading position.

The principal objects of the present invention, accordingly, are to provide broaching machine constructions embodying operating features of the above mentioned type. It is also an object of the present invention to simplify and improve in general the construction of automatic broaching machines. Other objects and advantages of the present invention appear in the following description and in the appended claims.

In the drawing,

Fig. 1 is a top plan view, partly in section, of one form of the present invention, and Fig. 2 is a view in side elevation, partly in section, of a modification of the present invention.

Referring first to Fig. 1 the improved machine comprises generally a horizontally disposed bed 162 which supports a ram mechanism including a cylinder 183 which moves longitudinally of the bed. The bed also supports a work table 160 for movement transversely thereof. The work table 160 is illustrated as being suitably guided within ways 161, and is provided with suitable work holding fixtures such as the pins 165, to provide supports for the illustrative oppositely disposed work pieces 163 and 164. The work table 160 is movable from the illustrated position in which the work piece 164 is in broaching position and the work piece 163 is in a retracted loading position, to a position in which the work piece 163 is in cutting position and the work piece 164 is in a retracted loading position.

The mechanism for effecting the just mentioned movements of the work table 160 is illustrated as comprising a suitable ram mechanism 170, carried by the bed 162, and having a piston rod connected to the table 160 in any suitable manner. The actuation of the ram mechanism 170 is in turn controlled by a suitable reversing valve 171. The valve 171 is provided with a suitable supply line 172, an exhaust line 176 and with a pair of lines 173 and 175 which lead respectively into the ram mechanism 170 at opposite sides of the piston thereof. It will be appreciated that when valve 171 occupies, for example, the illustrated position, line 173 is connected to the supply line 172 and line 175 is connected to the exhaust line 176. After valve 171 is thrown to the opposite position these connections are reversed, line 173 being connected to exhaust and line 175 being connected to supply. The mechanism for effecting movements of the valve is described in more detail below.

The cylinder 183 is provided with a suitable tool carriage 182 which in turn supports a pair of broaches 180 and 181 which are arranged at respectively opposite sides thereof, and are secured thereto in any suitable well known manner. The broaches 180 and 181 are oppositely faced, so that the broach 180 is operative during movement thereof to the right as viewed in Fig. 1, and the broach 181 is operative during movement thereof to the left.

Cylinder 183 is slidably supported on a tubular piston rod 184, which is suitably supported at its ends upon the bed 162, and which is provided intermediate its ends with a fixed piston 185. Collars 186 and 186' which seal the ends of cylinder 183, are provided with tongues 187 and 188 respectively which enter cooperating grooves 189 formed in the piston rod 184, and act to prevent rotation of cylinder 183 with respect to the piston rod 184.

Piston rod 184 is provided with a pair of openings 190 and 191 which are positioned at respectively opposite sides of a dividing wall formed in the bore of the piston rod 184. The openings 190 and 191 communicate respectively with the two portions into which cylinder 183 is divided by the piston 184. Opening 191 communicates through the bore 194 and valve 192, with suitable supply and exhaust lines. Similarly, opening 191 communicates through the bore 195 and valve 193, with corresponding supply and exhaust lines. It will be appreciated that when valve 192 occupies one position, it connects the bore 194 to supply and when it is in the other position it connects bore 194 to exhaust. Valve 193 is similarly arranged.

The mechanism for causing the movement of the valves includes the push rod 198, and the valve operating arms 196 and 197. The valve operating arms are positioned for engagement by the cylinder 183 at the respectively opposite limits of the travel thereof.

Considering the operation of the machine as a whole, the parts are shown in Fig. 1 with the cylinder 183 at its righthand limit of travel, which is the position occupied thereby at the completion of an operating stroke of the broach 180 and the completion of a return stroke of the broach 181. The arrival of the cylinder 183 at its right-hand limit of travel results in the movement of the valve operating arms 174, 196 and 197 to the position shown in Fig. 1. During the next or leftward stroke of the cylinder 183 it will be appreciated that the broach 181 is operative. Accordingly, the fluid circuits associated with the valve 171 are such that the arrival of the cylinder 183 at its right-hand limit of travel, actuates the ram mechanism 170 to move the work table 160 to the position shown in Fig. 1. In this position the work piece 164 is in cutting position and the work piece 163 is in loading position.

Similarly, the fluid circuits associated with the valves 192 and 193 are such that when these valves occupy the position shown in Fig. 1, the portion of cylinder 183 to the left of piston 185 is connected to supply and the portion of cylinder 183 to the right of piston 185 is connected to exhaust. Completion of these fluid circuits causes the cylinder 183 to move to the left, and perform the desired broaching operation on the work piece 164. During this broaching operation, the previously broached work piece 163 may be removed and replaced by a new work piece.

The arrival of cylinder 183 at its left-hand limit of travel brings the left-hand end thereof into engagement with the valve operating arm 196, and moves this operating arm in a clockwise direction to its opposite limit position. The movement of operating arm 196 is communicated to valve operating arms 174 and 197 through the push rod 198. The arrival, accordingly, of cylinder 183 at its left hand limit of travel reverses the positions of all of the valves.

The reversal in position of the valve 171 causes the table 160 to move to its opposite position, bringing work piece 160 to the broaching position, and moving work piece 164 to the retracted position. The reversal in position of valves 192 and 193 on the other hand connects the portion of cylinder 183 to the left of piston 185 to exhaust, and connects the portion of cylinder 183 to the right of piston 185 to the source of supply. Upon completion of the just mentioned connections cylinder 183 is caused to move to the right, during which movement the broach 180 is operative.

It will be seen, accordingly, that the machine is so arranged that, upon being placed in operation, the cylinder 183 continuously reciprocates between its right-hand and left-hand limit positions. The work table 160 correspondingly reciprocates, in timed relation to the movements of the broaches, the arrangement being such that each work piece is held in broaching position during the time that the associated broach is being moved in an operative direction, and is held in a retracted or loading position during the time the associated broach is being moved through a return stroke.

Referring to the modification shown in Fig. 2, in accordance with which the broaches move in a vertical path, illustrative work pieces 200 and 201 are retained in position on a common table 202 by brackets 203 and 204 respectively. Table 202 is slidably supported on frame 205 and may be reciprocated by fluid pressure actuating mechanism 206 in the manner described in connection with the other embodiment.

Oppositely disposed broaches 210 and 211 are tightly fitted into tool carriage 212, which in turn is mounted for movement with cylinder 213. Cylinder 213 is supported on piston rod 214 and is caused to reciprocate with respect thereto under the control of valves 215 and 216 in the manner described in connection with Fig. 1.

With this arrangement it will be understood, that during the up stroke of carriage 212, table 202 occupies a position to support work piece 200 in the cutting position and work piece 201 is withdrawn to the loading position. During the down stroke on the other hand, the parts occupy the illustrated positions, with work piece 201 in cutting position and work piece 200 in loading position.

It will be seen, therefore, that the present invention provides an automatic broaching machine of the multiple type, in which a plurality of broaching tools are simultaneously actuated, in which the respective work pieces are automatically moved from loading to cutting positions, and in which certain of the work pieces occupy loading positions during the time that others of the work pieces occupy cutting positions.

Although specific constructions have been described, it is evident that various modifications may be made without departing from the spirit and scope of the present invention. The described embodiments, accordingly, are to be considered in an illustrative and not in a limiting sense.

What is claimed is:

1. In a surface broaching machine, the combination of a single reciprocable tool carriage; a pair of broaching tools supported upon respectively opposite sides of said carriage with the cutting edges thereof oppositely directed so that one of said tools is effective to cut during one direction of movement of said carriage and the other of said tools is effective to cut during the opposite direction of movement of said carriage; a work holder individual to each of said tools for supporting a work piece in cutting relation to the associated tool; and a carriage common to said work holders reciprocable in a path transverse to the path of said carriage for moving said work holders into and out of cutting positions with respect to said carriage.

2. In a surface broaching machine, the combination of a single reciprocable tool carriage; a plurality of broaching tools supported upon respectively opposite sides of said carriage with the cutting edges thereof oppositely directed so that one of said tools is effective to cut during one direction of movement of said carriage and another of said tools is effective to cut during the opposite direction of movement of said carriage; a work holder individual to each of said tools for supporting a work piece in cutting relation to the associated tool; a carriage common to said work holders for supporting said work holders upon said opposite sides and reciprocable in a path transverse to the path of said carriage for moving said work holders into and out of cutting positions with respect to said tool carriage; and means for controlling said common carriage so that each of said work holders is in cutting position during the time the associated tool is effective to cut.

3. In a surface broaching machine, the combination of a single reciprocable tool carriage; a plurality of surface broaching tools supported on respectively opposite sides of said carriage with the cutting edges thereof oppositely directed so that one tool is effective to cut during one direction of movement of said carriage and the other tool is effective to cut during the opposite direction of movement of said carriage; a plurality of work holders, one individual to each of said tools for supporting work pieces in cutting relation to the associated tool; a carrier common to said work holders for supporting them on respectively opposite sides of said carriage and for moving said work holders between cutting and retracted loaded positions; and control means for said carrier actuated in accordance with the position of said carriage and effective to cause said carrier to maintain one of said holders in cutting position and the other of said holders in loading position during one direction of movement of said carriage, and to cause said carrier to maintain said one holder in loading position and said other holder in cutting position during the opposite direction of movement of said carriage.

WILLIAM A. HART.